Nov. 15, 1938.    J. A. MacLEAN    2,136,799
PUMP SEAL
Filed March 25, 1936

INVENTOR.
John A. MacLean.
BY
HIS ATTORNEY.

Patented Nov. 15, 1938

2,136,799

UNITED STATES PATENT OFFICE 2,136,799

PUMP SEAL

John A. MacLean, Hampton, N. J., assignor to Ingersoll-Rand Company, Jersey City, N. J., a corporation of New Jersey Application March 25, 1936, Serial No. 70,834

5 Claims. (Cl. 286—9)

This invention relates to sealing devices and more particularly to a pump seal to prevent leakage along the shaft of a centrifugal pump. In pumps of this kind one or more impellers mounted on a shaft comprises a rotor which usually works at a pressure above or below that of the atmosphere. As at least one end of the rotor shaft is usually exposed to atmospheric pressure there is always a pressure differential at different parts of the shaft tending to cause leakage therealong.

It is an object of this invention to provide a liquid packing or seal for such shafts which will rely in part upon centrifugal force to accomplish its sealing action. A further object is to construct the seal in such manner that leakage may be prevented when the pump is not operating and there is no centrifugal force available. Other objects are either apparent or will be pointed out hereinafter.

Figure 1:
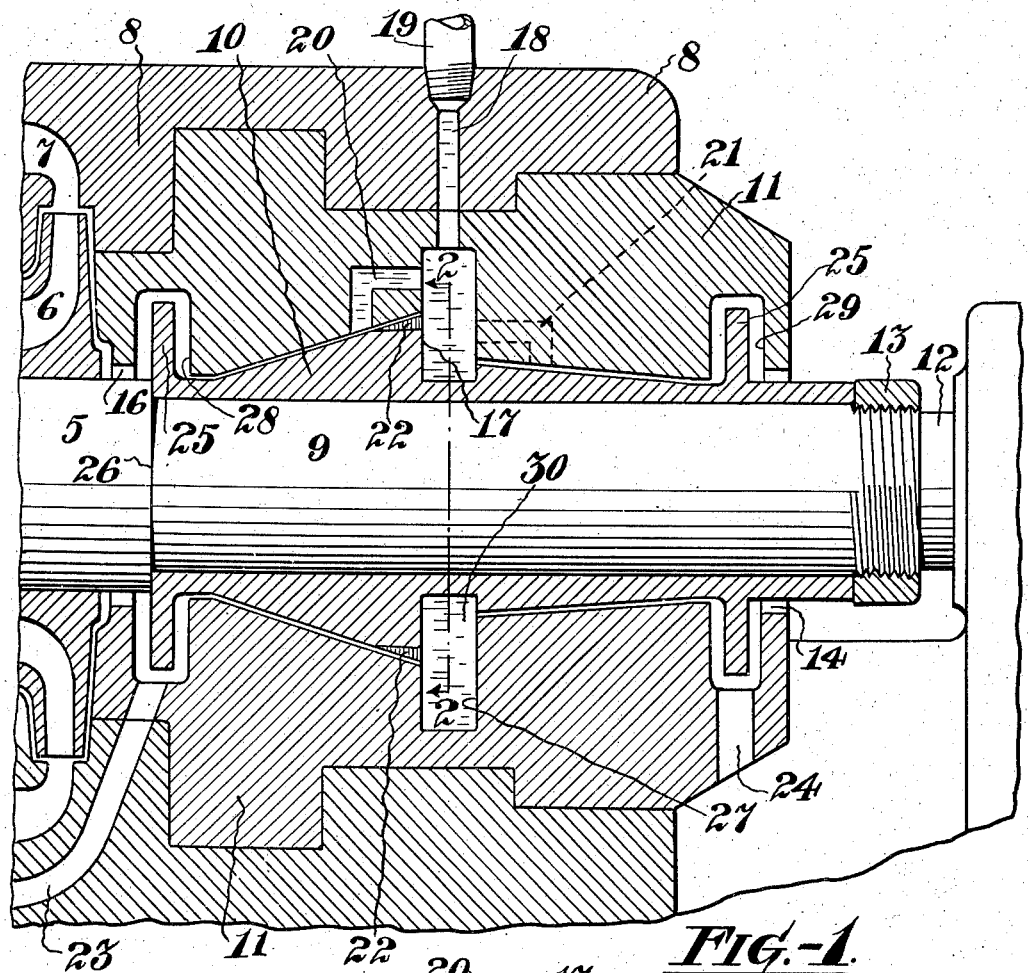
Figure 2:
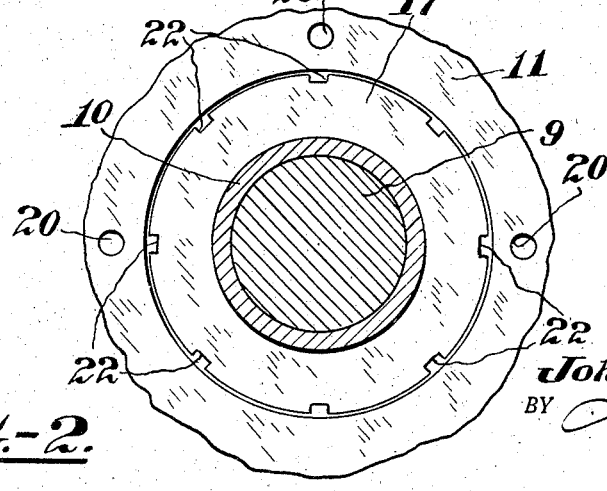

In the drawing, Fig. 1 is a longitudinal section of the outlet end of a centrifugal pump of the subatmospheric type to which the invention has been applied, and Fig. 2 is a cross section of Fig. 1 taken on the line 2—2 looking in the direction of the arrows.

Referring to the drawing, in which similar reference characters refer to similar parts, a shaft 5 having a reduced extension 9 may be suitably journaled in a bearing housed in the casing 12.

Mounted on the shaft 5 is an impeller 6 whose outlet discharges into a diffusor passage 7 formed in a casing 8. The casing 8 is customarily split, and a split seal housing 11, preferably of a malleable metal, is pressed into suitable recesses provided therefor. About the shaft extension 9 and fitting against a shoulder 26 of the main part of the shaft 5 is a sealing sleeve 10 of unusual design which will be more fully described hereinafter. A nut 13 threaded upon the shaft 9 bears against the outer end of the sleeve 10 and urges the inner end against the shoulder 26. The seal housing 11 is provided with a central bore generally corresponding in contour with the shape of the sleeve 10, and affording clearance space therefor.

A central annular groove 27 in the seal housing 11 is connected by a bore 18 running through the seal housing and the casing 8 to a pipe 19 which is connected to a source of liquid under pressure (not shown). A corresponding annular groove 17 on the central part of the sleeve 11 registers with the groove 27 and forms an annular liquid reservoir 30. Similar annular grooves 28 and 29 are formed near the ends of the housing 11 and flanges or baffles 25 formed on the sleeve 10 are received therein.

The groove 29 is open to atmosphere by an opening 14 in the housing and a drain passage 24 is provided whereby liquid collected in the bottom of the groove may pass off.

The groove 28 on the inner side of the housing 11 is connected by opening 16 to the discharge side of impeller 6. A passage 23 serves to drain the lower part of groove 28 and leads to a receptacle (not shown) which is vented to the low pressure side of the pump.

The outer surface of the sleeve on each side of the central groove 17 is tapered away from the groove. The surface on the low pressure (left hand) end of the sleeve has a steeper inclination than the surface on the high pressure (right hand) end resulting in an annular step or shoulder at the central portion. At the periphery of the shoulder are a number of slots 22 which function as impellers when the shaft and sleeve rotate. To avoid relative rotation of the shaft and sleeve the latter may be firmly secured to the former, preferably by press-fitting, although any of a number of conventional methods would serve the purpose.

In the example selected the pump is of the constant speed type adapted for use as an evacuator or vapor pump to exhaust an evaporator in which pressures as low as .2 inch of mercury may be maintained at the inlet. It is not feasible to construct such pumps of sufficient strength and power to permit starting when the evaporator is under atmospheric pressure. Usually it is necessary to reduce the pressure in the evaporator to approximately 1 inch of mercury before starting the vapor pump. While the preliminary evacuation is in progress it is essential to prevent air from leaking into the evaporator and reducing the vacuum. This may be accomplished by a simple mechanical seal or by a hydraulic seal, but when the unit is started and the shaft begins to rotate either of these is likely to break down, and in the hydraulic type liquid is likely to leak into the evaporator, flash into vapor and impair the effectiveness of the pump to such an extent, that, if the leakage is considerable, it may never evacuate the evaporator to the desired pressure.

In the present invention these handicaps are overcome by a comparatively simple and inexpensive device which is economical of sealing liquid and dependable in operation.

Before the initial steps in reducing pressure in the evaporator are taken water or other liquid is forced into the seal through pipe 19. The pressure upon this water must necessarily exceed 15 pounds absolute and should be as much more as is necessary to completely fill the space between the inclined surfaces of the sleeve 10 and the housing 11. This will depend, of course, upon the relative dimensions of the passage 18 and the clearances between the sealing surfaces.

Under these circumstances a conical sheet of water will flow outwardly from the annular reservoir 30, will impinge upon the inner sides of the baffles 25, collect in the grooves 28 and 29 and pass off through the conduits 23 and 24. Under protection of this seal the pressure in the evaporator may be reduced sufficiently to permit starting of the pump. As soon as shaft 5 starts to rotate centrifugal forces are generated along the surface of the sleeve 10 which tend to set up a flow of sealing water along the inclines toward the center well 30. This naturally reduces the flow along the surface of the sleeve and against the baffles 25.

The centrifugal action, of course, is proportional to the peripheral speed which in turn depends upon the diameter of the sleeve. The angularity of the sleeve surface must be designed with this in mind, for if too great centrifugal forces were created the water would be thrown out of the seal, against the pressure in the pipe 19, with the result that the seal would be broken and air would flow into the evaporator and impair the vacuum therein.

This consideration is responsible for the fact that the angularity of the slope or taper of the sleeve 10 on the high pressure (right hand) end is considerably less than on the low pressure (left hand) end.

Assuming absolute pressures of .5 pound in the evaporator, 20 pounds in the pipe 19, and 15 pounds on the atmospheric end of the seal, it follows that a centrifugal pressure of over 5 pounds will cause the high pressure end to run dry, whereas a centrifugal pressure of 19½ pounds is necessary to overcome the differential on the low pressure end. It will be apparent, therefore, that suitable peripheral speeds with suitable centrifugal action may be obtained by the skillful design of the slope of the sleeve surfaces.

The centrifugal effect referred to is possible by reason of the friction between the surface of the sleeve and the sealing water. Where greater efficiency is desired the slots 22 may be provided on the periphery of the sleeve.

It will be apparent that the effect of excessive centrifugal action can always be corrected by increasing the pressure of the sealing fluid in the pipe 19. In practice it is found advisable to have sufficient pressure in this pipe to insure a slight circulation of fluid between the sealing surfaces at all times.

To safeguard against running dry in the event that peripheral speeds should exceed those estimated, or that pressure in the pipe 19 should drop below the predetermined minimum, passageways 20 and 21 may be provided in the housing 11 connecting the well 30 with points of lower peripheral speeds on the sleeve, so that some water may circulate at all times. These passages need only be provided on the upper half of the seal for the effect of gravity upon the sealing water will ordinarily insure the presence of water in the bottom of the seal, particularly as the water in the central well is subject to the minimum centrifugal action.

Although the invention has been explained as applied to an evacuator it will be clear to those skilled in the art that by turning the seal end for end it may be applied with equal effect to a pressure pump.

Although I have shown the seal as being at the outlet end of the compressor, I do not wish to be so limited for it is apparent that in general the invention may be applied with equal effect to the inlet end of the compressor.

Having thus described the invention I do not wish to be restricted to the specific form disclosed, but claim:

1. In a sealing device for sealing between zones of high and low pressure along the shaft of a rotary pump or the like, a sleeve affixed to the shaft, a housing for the sleeve, a reservoir formed in the housing intermediate the ends thereof, conforming inclined surfaces on the sleeve and housing providing annular sealing spaces therebetween on both sides of the reservoir, each of said spaces opening into the reservoir and having greatest diameter at such opening, the surfaces on the low pressure side of the reservoir having greater slope and mean diameter than the surfaces on the high pressure side, and means to convey sealing fluid to the reservoir for delivery to said spaces.

2. In a sealing device for the shaft of a rotary pump or the like wherein said device is subjected to higher pressure at one end than at the other end, a sleeve affixed to the shaft, a housing for the sleeve, a reservoir formed in the housing intermediate the ends thereof, conforming inclined surfaces on the sleeve and housing providing annular sealing spaces therebetween on both sides of the reservoir, said spaces opening into the reservoir, the surfaces on the low pressure side of the device having greater mean diameter than the surfaces on the high pressure side, and means to convey sealing fluid to the reservoir for delivery to the sealing spaces.

3. In a sealing device for the shaft of a rotary pump or the like, a sleeve affixed to the shaft, a housing for the sleeve, conforming inclined surfaces on the sleeve and housing providing sealing spaces therebetween, a reservoir in the housing into which the sealing spaces open, means to convey sealing fluid to the reservoir for delivery to the sealing spaces, and passages in the housing separate from the sealing spaces leading from the reservoir to points along the sealing spaces whereby continuous circulation of sealing fluid through the spaces is assured.

4. In a sealing device for sealing zones of high pressure and low pressure along the shaft of rotary pumps or the like, a sleeve affixed to the shaft having a tapered high pressure zone surface and a tapered low pressure zone surface of greater slope and mean diameter than the tapered high pressure surface, and a housing for the sleeve having conforming high and low pressure surfaces to provide annular sealing space therebetween, and means to supply sealing fluid to said spaces.

5. In a sealing device for sealing zones of high pressure and low pressure along the shaft of a rotary pump or the like, a sleeve affixed to the shaft having a tapered high pressure zone surface and a tapered low pressure zone surface of greater slope and mean diameter than the tapered high pressure surface, a housing for the sleeve having conforming high and low pressure surfaces to provide annular sealing spaces therebetween and a sealing fluid reservoir in the housing into which the sealing spaces open.

JOHN A. MacLEAN.